(12) United States Patent
Klotz et al.

(10) Patent No.: US 11,407,543 B2
(45) Date of Patent: Aug. 9, 2022

(54) TRANSFER UNIT AND PROCESS

(71) Applicant: SIDEL CANADA INC, Québec (CA)

(72) Inventors: Franck Klotz, Québec (CA); Paulo Arruda, Québec (CA)

(73) Assignee: Sidel Canada Inc., Laval (CA)

( * ) Notice: Subject to any disclaimer, the term of this patent is extended or adjusted under 35 U.S.C. 154(b) by 370 days.

(21) Appl. No.: 16/087,410

(22) PCT Filed: Mar. 25, 2016

(86) PCT No.: PCT/IB2016/000375
§ 371 (c)(1),
(2) Date: Sep. 21, 2018

(87) PCT Pub. No.: WO2017/163097
PCT Pub. Date: Sep. 28, 2017

(65) Prior Publication Data
US 2019/0112086 A1    Apr. 18, 2019

(51) Int. Cl.
| | | |
|---|---|---|
| B65B 35/00 | (2006.01) | |
| B65B 35/40 | (2006.01) | |
| B65B 13/00 | (2006.01) | |
| B65B 21/06 | (2006.01) | |
| B65B 21/14 | (2006.01) | |
| B65G 57/03 | (2006.01) | |

(52) U.S. Cl.
CPC ............ B65B 35/405 (2013.01); B65B 13/00 (2013.01); B65B 21/06 (2013.01); B65B 21/14 (2013.01); B65B 35/00 (2013.01); B65G 57/03 (2013.01)

(58) Field of Classification Search
USPC .......................................................... 53/252
See application file for complete search history.

(56) References Cited

U.S. PATENT DOCUMENTS

| | | |
|---|---|---|
| 3,363,394 A | 1/1968 | Rainbow |
| 4,041,853 A | 8/1977 | Verwey et al. |
| 4,534,153 A | 8/1985 | Nowicki |
| 5,074,744 A | 12/1991 | Matstak |
| 5,271,709 A | 12/1993 | VanderMeer et al. |

(Continued)

FOREIGN PATENT DOCUMENTS

| | | | |
|---|---|---|---|
| EP | 6 596 664 A1 | 6/1995 | |
| EP | 0999156 A1 * | 5/2000 | ............ B65G 57/14 |

(Continued)

OTHER PUBLICATIONS

International Search Report, dated Dec. 7, 2016, from corresponding PCT application.

*Primary Examiner* — Chinyere J Rushing-Tucker

(57) ABSTRACT

Disclosed is a method for transferring products, to or from a product collection surface of a product processing line, on which they can accumulate, in which method products are stored in trays. The method includes a loaded tray transfer step, during which a tray, namely the collection tray, is separately moved between the collection surface and a receiving zone, where tray conveyor is provided, as well as a product transfer step, during which products are transferred between the collection surface and the collection tray with a planar sweeping movement, while the collection tray is held flush with the collection surface. Also disclosed is a corresponding device for transferring products.

14 Claims, 1 Drawing Sheet

(56) References Cited

U.S. PATENT DOCUMENTS

| | | | |
|---|---|---|---|
| 6,059,519 A | 5/2000 | Dutto et al. | |
| 6,394,744 B1* | 5/2002 | Price | B65G 60/00 414/411 |
| 2006/0042194 A1* | 3/2006 | Lucido | A21C 15/00 53/448 |
| 2008/0019818 A1* | 1/2008 | Kent | B65G 57/03 414/788.1 |
| 2008/0019819 A1* | 1/2008 | Reed | B65G 57/303 414/791.6 |
| 2008/0229708 A1* | 9/2008 | Schulte | B65B 5/06 53/167 |
| 2009/0000415 A1* | 1/2009 | Parker | B65G 47/32 74/490.01 |
| 2010/0129188 A1* | 5/2010 | Perl | B65G 57/005 414/789.5 |
| 2010/0316479 A1* | 12/2010 | Perl | B65G 17/345 414/791.6 |
| 2010/0316480 A1* | 12/2010 | Perl | B65G 57/03 414/802 |
| 2011/0277423 A1* | 11/2011 | Magri | B65G 57/24 53/443 |
| 2012/0027555 A1* | 2/2012 | Germain | B65G 57/245 414/791.6 |
| 2013/0213841 A1* | 8/2013 | Ward | A01G 9/081 206/386 |
| 2014/0251165 A1* | 9/2014 | Shatley | B65B 13/18 100/2 |
| 2014/0294553 A1* | 10/2014 | Petrovic | B65G 61/00 414/794.6 |
| 2014/0294554 A1* | 10/2014 | Laudet | B65D 5/48022 414/802 |
| 2015/0068870 A1* | 3/2015 | Beer | B65G 47/845 198/463.3 |
| 2019/0077614 A1* | 3/2019 | Tommesani | B65G 57/03 |

FOREIGN PATENT DOCUMENTS

| | | |
|---|---|---|
| FR | 2679878 A1 | 2/1993 |
| GB | 1374754 A | 11/1974 |

* cited by examiner

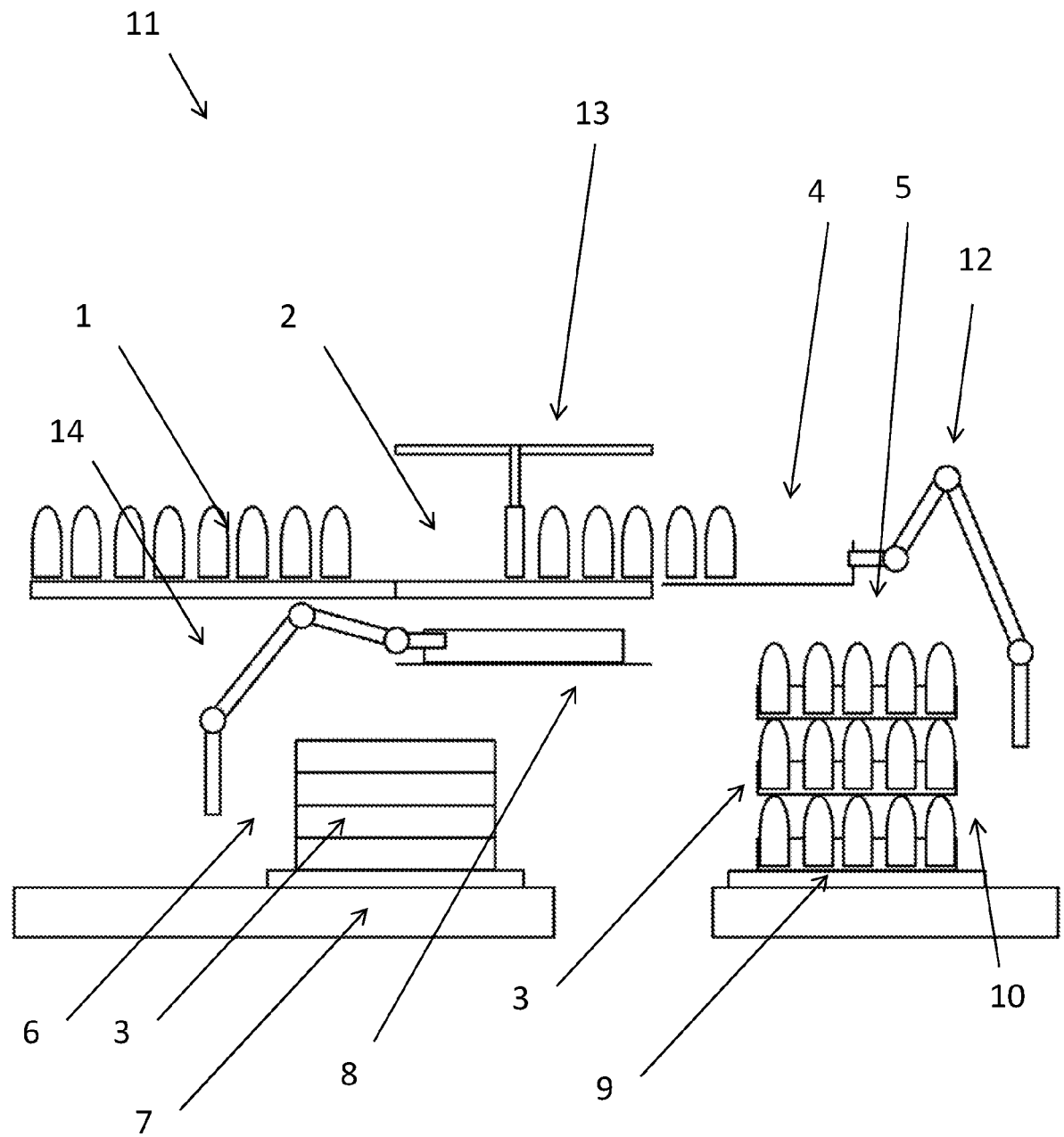

TRANSFER UNIT AND PROCESS

DESCRIPTION

The current invention belongs to the domain of products loading or unloading in an industrial processing line, for example palletization or depalletisation, which means transfer of unstable products like bottles or cans from or to a treatment line, like a packaging line. The object of the present invention is a transfer process and a corresponding transfer unit.

In the field of the present invention, the industrial line consists of a packaging line, preferably for beverage or liquid containers. The normal entire treatment process comprises steps like manufacturing the product itself, meaning bottle filing, closing, labeling, etc. A later significant part of the process consists in grouping single products in packs, boxes, or cases. These groups are then collected and prepared for shipment, preferably by stacking them as layers on a pallet.

There is a current need in the market for an increase of flexibility, allowing with the same overall processing line, to obtain different sorts of groups of products. This means the possibility to group together in said packs or boxes different sorts of products obtained upstream. One group is then made of different sorts of products.

To answer this global tendency, it is proposed to have an intermediate warehouse or storage in which single products of different types are stored. They will be extracted from this warehouse later on, for being grouped with single products of other types, also extracted from this warehouse. This warehouse forms an intermediate buffer for a plurality of types of products: it collects the production of different upstream product creating line portions, and provides the products to downstream grouping line portions.

In this context, there is a need for solutions to collect and transfer a mass of single products produced by an upstream line portion, as well as for solutions to deliver a mass flow of single products to a downstream line portion.

EP659664 as well as U.S. Pat. Nos. 5,271,709 and 5,074,744 propose to sweep a mass of products onto an existing stack, and to move the entire stack down to receive the next layer. The two main problems of such solutions are that the stack is not stable, and that a complex installation is needed for lowering the stack at each new layer.

Solutions based on trays have been proposed, for example in FR2679878. The disclosed tray has referencing cavities or ribs, stabilizing the products. The drawback is however that the tray design is specific to the product. Also, products can only be deposited from the top of the tray, which then requires elaborated loading systems.

GB1374754 proposes a solution for discharging trays loaded with a mass of products. Here again, the stack is lifted at each new tray to discharge, which leads to a quite complex installation.

Therefore, the invention aims at improving the present state of the art, at least by proposing a way, both in terms of process and implementing unit, to transfer products between a treatment line and an intermediate storage, which is easy, flexible, and/or fast.

In order to reach this, the invention proposes to load products in trays, and to move only one tray at a time between the treatment line and tray conveying means, which may bring it to or from other line portions. This further upstream or downstream tray transfer may be performed for each tray separately or for a group of tray simultaneously, for example a stack of trays.

This principle can be used for either a product loading process, in which products are received from the treatment line and collected in trays eventually later stored in a warehouse, or a product unload process, in which products are received by the treatment line, from trays eventually coming from a warehouse.

According to the invention, there is provided a method for transferring products, to or from a product collection surface of a product processing line, on which they can accumulate, in which method products are stored in trays. This method is characterized in that it comprises a loaded tray transfer step, during which a tray, namely the collection tray, is separately moved between the collection surface and a receiving zone, where conveying means for tray are provided, as well as a product transfer step, during which products are transferred between the collection surface and the collection tray with a planar sweeping movement, while the collection tray is held flush with the collection surface.

There is also provided a corresponding device, which is a transfer unit for transferring products 1 to or from a collection surface of a processing line, on which they can accumulate, said unit comprising a receiving zone for receiving trays, where a tray conveying means is provided.

According to the invention, this transfer unit comprises
a first actuator 12 for transferring a collection tray 4 between the receiving zone 5 and in front of the collection surface 2,
a second actuator 13 for transferring products 1 with a sweep movement between the collection surface 2 and the collection tray 4 while it faces said collection surface 2.

Further features and advantages of the present invention will be better understood from the description of preferred embodiments, which is given below by way of a non-limiting illustration, with reference to the accompanying drawing showing a possible embodiment.

As briefly introduced here above, a first object of the present invention is a method for transferring products 1, to or from a product collection surface 2 of a product 1 processing line, on which they can accumulate, in which method products 1 are stored in trays 3.

Products 1 can be bottles, flasks, cans, etc. They are treated by the processing line either upstream from the collection surface 2, or downstream from it.

In the former case, the processing line outputs a mass product 1 flow, and the method works as a product 1 palletization or loading process based on trays 3 loaded with products 1. Products 1 treated by the processing line are freely received and accumulated on the collection surface 2, for further transfer in a tray 3, while it is temporarily firmly fixed at the level of said collection surface 2. Once loaded, this tray 3 is then moved and released in a receiving zone 5, on dedicated conveying means. The loaded tray 3 can then be conveyed out of the receiving zone 5. Alternatively, many trays 3 can be piled on a pallet 9, in the receiving zone 5. Once a predetermined number of trays 3 has been received and stacked to form a product stack 10, the trays 3 are conveyed out of the receiving zone 5 as a batch, by said conveying means.

In the latter case, the processing line needs products 1 as an input, and the method works as a product 1 depalletisation or unloading process based on trays 3 full with products 1. Loaded trays 3 are received in a receiving zone 5, either one by one or as a batch of trays 3 stacked on a pallet 10 for forming a product stack 10. The conveying means bring the trays 3 in said receiving zone 5. The tray 3 or the uppermost tray 3 is then lifted to be brought in front of the collection surface 2. The products 1 are then transferred as a batch on the collection surface 2. Once unloaded, the empty tray 3 is brought by the same actuator in an empty tray zone 7.

In either cases, one single actuator, namely the first actuator 12, holds the loaded tray 3 in front of the collection surface 2, and moves it fully loaded, before or after holding it, and unloaded, after or before holding it. This first actuator 12 is in charge of maintaining one single collection tray 4 at a time in front of the collection surface 2, as well as of moving it to or from the receiving zone 5, and to or from the empty tray zone 7.

As understood, each tray 3 comprises a batch of products 1, coming from or going to the collection surface 2. Therefore, the size of the collection surface 2 is at least the size of a tray 3. The products 1 are freely positioned in the tray 3 are form a bulk batch. At this stage, their position is free in the tray 3, with respect to each other product 1.

Hence, loaded trays 3 are temporarily present in the receiving zone 5. The trays 3 can be conveyed one by one out of or in the receiving zone 5. Loaded trays 3 may also be conveyed as a batch of stacked trays 3, forming a product stack 10. The conveying means, working for moving trays 3, are adapted to move either single trays 3 or piles of trays 3, and, for example, consists in a roller based conveyor, belt base conveyor, carriage, autonomous vehicle, etc. This conveying means may transfer the loaded trays 3 between the receiving zone 5 and a storehouse, in which trays 3 or product stacks 10 are temporarily stocked.

According to the invention, the method comprises a loaded tray 3 transfer step, during which a tray 3, namely the collection tray 4, is separately moved between the collection surface 2 and a receiving zone 5, where conveying means for tray 3 are provided, as well as a product transfer step, during which products 1 are transferred between the collection surface 2 and the collection tray 4 with a planar sweeping movement, while the collection tray 4 is held flush with the collection surface 2.

Therefore, the method moves one tray 3 at a time between the collection surface 2 and the receiving zone 5, and between the collection surface 2 and an empty tray zone 7. The collection tray 4 can be loaded of products 1 first, and then moved at the top of the product stack 10 like in a palletization process. Alternatively, the uppermost tray 3 of the product stack 10, full of products 1 independent to each other, is transferred to the collection surface 2, like in a depalletisation process.

When trays 3 are stacked as a product stack 10 in the receiving zone 5, the tray 3 processed, for either loading products 1 or unloading products 1, namely the collection tray 4, is the uppermost tray 3 of the product stack 10: either the uppermost tray 3 is lifted from the product stack 10 and brought in front of the collection surface 2 for unloading and then brought to an empty tray zone 7, or an empty tray 3 is taken from an empty tray zone 7, brought in front of the collection surface 2 and then brought down and piled on the product stack 10, as its uppermost tray 3. These movements are performed with a first actuator 12.

The first actuator 12 temporarily holds the tray 3 in front of the collection surface 2. The flat bottom surface of the tray 3 then arrives flush with the collection surface 2. It is then possible to transfer the whole batch of products 1 in a single sweep action, from the tray 3 to the collection surface 2 or from the collection surface 2 to the tray 3.

Therefore, the empty collection tray 4 is brought in front of the collection surface 2, for obtaining a flush assembly. The tray forms a surface which faces, at this moment, the collection surface 2.

According to a possible additional feature, the method further comprises an empty tray 3 transfer step, during which the collection tray 4, empty, is transferred between the collection surface 2 and the top of an empty tray stack 6 in an empty tray zone 7. Empty trays 3 are normally located in a certain empty tray zone 7. They can be piled on a pallet 9, brought to or extracted from the empty tray zone 7. In other words, there is a stack of empty trays 3, from which a tray 3 is taken to be loaded in a palletization process, or to which an unloaded tray 3 is brought after a depalletisation.

It should be noted here that from a general standpoint the first actuator 12 manipulates trays 3 in this empty tray zone 7, the receiving zone 5, and in front of the collection surface 2.

According to another possible additional feature, the empty tray 3 transfer step comprises two successive steps, which are a first step of bringing the empty collection tray 4 from the empty tray stack 6 to an intermediary zone 8, and a second step of bringing the collection tray 4 from said intermediary zone 8 to the collection surface 2. This reduces the cycle time, as it may then be possible to have simultaneous steps: the collection tray 4 of the future cycle is prepared while the collection tray 4 of the current cycle is being processed, for example transferred from in front of the collection surface 2 to the receiving zone 5.

According to another possible additional feature, the method further comprises a step of opening the collection tray 4, during which a lateral door of said tray 3 is opened for allowing a later product 1 movement through the corresponding aperture. This door is located in a side wall of the tray 3, and may for example be removed, pivoted, etc.

This step of opening the collection tray 4 is executed prior to transferring the products 1 from the collection surface 2 onto the collection tray 4. Opening this door gives access to a side aperture through which products 1 are then transferred. The door may consist of an entire side wall of the tray 3. The collection tray 4 may be opened by a third actuator 14, which functions is mainly to transfer the empty collection tray 4 from the empty tray zone 7 to the intermediary zone 8. Therefore, when said third actuator 14 releases the opened collection tray 4 on the intermediary zone 8, said collection tray 4 is already open, and no further transformation is required for it to receive the products 1. From a general standpoint, in some specific embodiments, the empty tray 3 opening step is performed before depositing it in the intermediary zone 8.

In some embodiments, the method further comprises a step of closing the collection tray 3, after it has received products 1 from the collection surface 2 in front of which it temporarily stays, during which step a lateral door of said tray 3 is closed for retaining products 1 in the tray 3. This step is complementary to the preliminary described step of opening the collection tray 4.

Hence, this door is here to avoid products 1 falling out of the collection tray 4, and, when removed, gives access to the bottom surface of the collection tray 4 for receiving the products 1.

According to another possible feature of the method, closing the collection tray 3 is the final phase of the product 1 sweeping transfer from the collection surface 2 to the collection tray 3. Therefore, the door can be taken off the collection tray 4, or even simply taken from a door stock by the third actuator 14, and then brought to the second actuator 13, working as a pusher. This door forms then a flat wall acting as a pushing surface for the second actuator 13. At the end of the sweep transfer from the collection surface 2 to the collection tray 4, the door arrives to its closing position and is released then.

According to another additional possible feature, trays 3 are stacked on a pallet 9 as a product stack 10 in the receiving zone 5 prior to moving them from said zone, the method further comprising at least one strapping step during which a vertical strap is closed in loop onto the product stack 10 for stabilizing it. In the corresponding embodiments, the trays 3 once loaded with products 1 are stacked on a pallet 9. When the pallet 9 is considered full, it is extracted from the transfer unit 11 where the transfer took place. The entire product stack 10 is then strapped with bands for improving its mechanical properties and especially rigidity. These bands are put and oriented in a vertical fashion, surrounding the entire stack. The ends are then fixed together for creating a closed loop. The product stack 10 can be surrounded by more than one such strap.

After this strapping step, the product stack 10 is rigid enough for sustaining different movements, for example to reach a storehouse in which are stored many different such stacks 10 of different types of product 1.

Hence, from a general standpoint, according to another possible additional feature of the method, it further comprises a tray 3 transfer step, during which the at least one tray 3 in the receiving zone 5 is transferred between said receiving zone 5 and a storehouse able to store many different such trays 3, potentially stacked forming a product stack 10 on a pallet 9. This step can therefore consist in transferring a product stack 10, comprising a pile of trays 3 loaded with products 1.

A second object of the present invention is a device for implementing the method described above, that is a transfer unit 11 for transferring products 1 to or from a collection surface 2 of a processing line, on which they can accumulate, said unit 11 comprising a receiving zone 5 for receiving trays 3, where a tray 3 conveying means is provided. This tray 3 conveying means can be a belt based conveyor, a roller conveyor, etc. This conveying means is preferably controllable and switches on and off upon request. In a bulk palletization process, in which the collection surface 2 forms the downstream end of the line, this conveying means brings the trays 3 out of the receiving zone 5. In a bulk depalletisation process, on which the collection surface 2 forms the upstream end of the line, it serves for bringing the trays 3 in said zone.

As already explained, the products 1 preferably form a product stack 10, with trays 3 loaded with products 1 piled above each other on a pallet 9. Preferably, the collection surface 2 and the conveying means for trays 3 are at different vertical levels: the collection surface 2 is preferably at a height above said conveying means.

According to the invention, the transfer unit 11 comprises
a first actuator 12 for transferring a collection tray 4 between the receiving zone 5 and in front of the collection surface 2,
a second actuator 13 for transferring products 1 with a sweep movement between the collection surface 2 and the collection tray 4 while it faces said collection surface 2.

The first actuator 12 can stand the weight of a full loaded tray 3, and is precise enough to hold a tray 3 in front of the collection surface 2 for allowing a planar transfer of the products 1 between them. The first actuator 12 treats one tray 3 at a time, and either lifts it from the conveying means or from a product stack 10 comprising many other trays 3 on a pallet 9, or brings it on the conveying means or such a product stack 10. Preferably, this first actuator 12 is robot based.

The second actuator 13 is mainly here to push the batch of products 1 from the collection surface 2 to the collection tray 3. This second actuator 13 can be a mere sliding pusher.

The first actuator 12 may have a simple vertical movement, gripping and releasing trays 3, and the second actuator 13 may have a simple horizontal movement, for loading the products 1.

Hence, in some embodiments, the second actuator 13 works as a pusher moved along a linear sweeping direction. The collection surface 2 is planar, so as the tray 3 temporarily fixed in front of it, at least during the product 1 transfer. This sweeping movement is parallel to the horizontal collection surface 2.

In some embodiments of the transfer unit 11, it further comprises an empty tray zone 7, where an empty tray 3 can be taken from the top of an empty tray stack 6 located therein and brought in front of the collection surface 2 for being loaded with products 1, the first actuator 12 contributing to transferring the empty tray 3 between the empty tray zone 7 and the collection surface 2.

As already explained, the empty trays 3 arrive in the transfer unit 11 preferably at ground level, whereas the collection surface 2 is at a higher level. The empty trays 3 are preferably provided in the transfer unit 11 with a conveyor, like a roller based conveyor or belt based conveyor. In this empty tray zone 7, the trays 3 can be stored in a closed state, thereby requiring an opening step prior to products 1 transfer: in such cases, the trays 3 are opened prior to receiving the batch of products 1 accumulated on the collection surface 2. In other cases, the trays 3 are stored open, for example with a side wall already removed or a flap open.

According to another possible feature, the collection surface 2 is at an upper deck, above the empty tray zone 7. As illustrated FIG. 1, the transfer unit 11 is then so organized as to show, at one side, a region dedicated to empty trays 3 and products 1 at an end of the processing line, either upstream or downstream, and, at the other side, a region dedicated to loaded trays 3. The first actuator 12 acts for moving loaded trays 3 between the two regions. Preferably, the loaded trays 3 are conveyed by conveying means near floor level, in a receiving zone 5, aside an empty tray zone 7. The latter is under the level of the collection surface 2. Hence, at least the corresponding end of the processing line and corresponding product 1 conveying means, for example belt conveyors, evolve at a high level, and the means for conveying the empty trays 3 and the loaded trays 3 evolve at the ground level. This brings an overall compact transfer unit 11.

In some embodiments of the transfer unit 11, it further comprises an intermediary zone 8, as well as a third actuator 14, for transferring the empty tray 3 between the empty tray zone 7 and the intermediary zone 8, the first actuator 12 transferring the empty tray 3 between the intermediary zone 8 and the collection surface 2.

This third actuator 14 may contribute to open the tray 3 to process by removing a flap or wall, and providing it to the sweeping actuator, namely the second actuator 13, for it to close the tray 3 at the end of the sweep movement.

Empty trays 3 are brought by the third actuator 14 from the empty tray zone 7 to the intermediary zone 8. They are further taken from the first actuator 12 and brought facing the collection surface 2.

According to another possible additional feature of the transfer unit 11, it further comprises a means for transferring trays 3 between the receiving zone 5 and a storehouse. Said storehouse may stock a great number of different trays 3. Preferably, each tray 3 or each product stack 10 is specifically identified and its position is known in the storehouse. This storehouse serves for temporarily receiving loaded trays 3: they may be received by such a transfer unit 11 working in a depalletization mode, upstream to a product 1 processing line; they may also be sent by such a transfer unit 11 working in a palletization mode, downstream to a product 1 processing line.

In the embodiment shown in the attached FIGURE, the transfer unit 11 and the corresponding process are for a palletization transfer. This means that it is mounted and executed downstream of an industrial treatment line, and serves for loading products 1 onto a stack of trays 3.

The line treats products 1 like containers for liquid, for example beverages. The products 1 are usually unstable, as their base is much smaller than their height. The treatment line creates the products 1 by making the container, filling it, closing it, labelling it, and further delivers them on a collection surface 2.

This collection surface 2 forms an accumulation area in which products 1 are collected, until they create a batch corresponding to the size of a tray 3. The collection surface 2 can be a dead plate, or a conveyor at the end of which an abutment surface stop is mounted for stopping the products 1, or even a controllable conveyor. Upstream from the collection surface 2, products 1 flow in a continuous way. This collection surface 2 accommodates a stop and go flow: products 1 are received until the predefined batch is reached, and then said batch is transferred. When used for loading a treatment line with products 1 loaded in trays 3, the collection surface 2 receives in one step the entire content of the collection tray 3 and a downstream flow extracts products 1 from it. A collection surface 2 works as a buffer, in which products 1 stand in a free layout, just like in the tray 3.

The collection surface 2 forms the downstream end of the treatment line, and the products 1 it generates are received by the transfer unit 11 and put in trays 3, which are then piled on a pallet 9. The obtained full product stack 10 can then be sent for further storage in a warehouse. This warehouse works as an intermediary stock, receiving different kinds of products 1, and delivering them to a downstream treatment line, for example comprising casing or wrapping machines. The transfer unit 11 and the corresponding process form an intermediary palletization process, meaning a palletization process prior to shipment of the final groups of products 1.

The transfer unit 11 also has a receiving zone 5 for receiving a pallet 9 on which the trays 3, filled with products 1, will be stacked. Preferably, the pallet 9 to receive the trays 3 is brought in this receiving zone 5 with a conveyor, preferably roller based conveyor. This conveyor may be located near ground level. By comparison, the collection surface 2 may be located in an upper level. Trays 3 receive a batch of products 1 at this upper level and are later brought down at the top of the product stack 10, or even directly at the pallet 9, with or without accumulating loaded trays 3 prior to going out of the transfer unit 11.

The transfer unit 11 also has an empty tray zone 7, in which trays 3 are waiting to be loaded with products 1. Here again, the empty trays 3 are brought to this empty tray zone 7 preferably piled on a pallet or equivalent base. This empty tray stack 6 is conveyed by a conveyor, preferably roller based conveyor, circulating near ground level.

The transfer unit 11 receives, in terms of inputs, an empty tray stack 6 in the empty tray zone 7, as well as products 1, in the collection surface 2, and delivers product stacks 10, in the receiving zone 5. The trays 3 may form stackable boxes, and the empty tray stack 6 may then have the same overall shape and format than the produced product stack 10.

A product stack 10 mainly consists in a pile of tray 3, each tray 3 being full of products 1, organized according to a free layout, each product 1 being freely positioned with respect to each other. A closed tray 3 has basically a flat bottom and four side walls, thereby forming a sort of box, preferably open at the top. The products 1 are freely positioned standing on this bottom. This pile of trays 3 rests on a pallet 9. The palletization process comprises depositing a new tray 3, named collection tray 4, full of products 1, on the top of this product stack 10.

The transfer unit 11 has a first actuator 12 for bringing an empty tray 3 for it to be loaded at the collection surface 2, and later bringing it on the top of the product stack 10, or the pallet 9 if this is the first tray 3 to be deposited. As will be further explained hereunder, the first actuator 12 brings the empty tray 3 next to the collection surface 2, and the bottom of the tray is flush with the collection surface 2. The tray 3 has a wall which can be at least partly open. Therefore, opening this door creates an aperture through which products 1, present on the collection surface 2, can easily be transferred on the bottom of the tray 3.

The first actuator 12 is preferably a robot, able to grasp a tray 3 and hold it in front of the collection surface 2. The gripping can be in a cantilever fashion, the tray 3 then extending directly from the head of the robot, located at the end thereof. The robot can work by clamping the tray 3 or supporting it thanks to a flat surface on which the tray 3 can rest. This flat surface can be a fork, for example. Preferably, the end of the robot is located at a side of the tray 3.

This first actuator 12 is therefore able to support a full tray 3 loaded with products 1, and to move it without products 1 falling inside or even outside the tray 3.

The transfer unit 11 also has a second actuator 13, for transferring a batch of products 1 between the collection surface 2 and the tray 3 to load, namely the collection tray 4. As understood, this collection tray 4 will later be deposited on the already existing full loaded trays 3.

The collection tray 4 is brought by the first actuator 12 in front of the collection surface 2. The wall separating the collection surface 2 and the bottom of the tray 3 is opened for allowing a simple product 1 transfer.

The second actuator 13 pushes from the back a batch of products 1 from the collection surface 2 onto the bottom surface of the tray 3. The movement of this transfer is a linear translation, therefore a sweep parallel to the bottom of the collection tray 4. Preferably, the products 1 loaded in the collection tray 4 are transferred in one single sweep step, as a single batch of products 1, in one step, from the back. The second actuator 13 can be a pusher mounted on slides parallel to the flat collection surface 2. The slides are then parallel to the lateral sides of the collection surface 2.

As already explained, in some embodiments, an entire wall of the collection tray 4 is taken off for later allowing the products 1 sweep from the collection surface 2 to the collection tray 4. This wall is the one between the collection surface 2 and the bottom of the collection tray 4.

The collection tray 4 is maintained by the first actuator 12 so that the bottom of the collection tray 4 arrives flush with the collection surface 2. The second actuator 13 pushes the products 1 to the temporarily fixed tray 3 through the aperture created by the missing wall.

In some embodiments, the wall is completely removed from the collection tray 4, and serves as a block or back face for pushing the products 1 inside the collection tray 4. Once the whole batch of products 1 has been transferred in the collection tray 4, said block arrives approximately at the boarder of the collection tray 4, where it is to be for closing the collection tray 4. Therefore, the removable wall can then easily be simply released on the collection tray 4 for closing it.

The wall is therefore mounted on the second actuator 13 and touches the end of the batch swept on the bottom surface of the collection tray 4. The second actuator 13 releases this wall once it has arrived in a position for closing the aperture through which products 1 have been transferred.

After the collection tray 4 has been fully loaded with a batch of products 1 and then closed to form a sort of box, it is transferred and deposited at the stop of the product stack 10.

The tray 3 can be held by the first actuator 12 in the following way. A head may be mounted at the free end of the first actuator 12. This head hangs under said free end and has a retractable support plate on which the collection tray 4 stands. In the active position, the tray 3 is fully supported by the head. In the retracted position, the collection tray 4 is released as the head provides no bottom support anymore. Such a retractable support plate can be done with roller based curtains, or equivalent.

As understood from what has been presented, the overall process cycle, when executed downstream a treatment line, comprises the following steps:

grasping an empty tray 3 from the empty tray stack 6, in the empty tray zone 7. This empty tray 3 is the collection tray 4, as it is dedicated to receive a batch of products 1 from the collection surface 2 and to be later deposited on the product stack 10;

bringing said collection tray 4 in front of the collection surface 2;

transferring in one sweeping step the entire batch of products 1, accumulated on the collection surface 2. A door of the tray 3, located aside the collection surface 2, is opened before this transfer. This door separates the collection surface 2 and the bottom surface of the tray 3. Also, after completion of this transfer, said door is closed again;

bringing the loaded collection tray 4 on the top of the product stack 10: either on the pallet 9 itself if this is the first tray 3, or on another tray 4;

When a targeted number of loaded trays 3 have been put on the pallet 9, or simply upon request in line with the process control, the entire product stack 10 may be surrounded by vertical straps at a treatment zone downstream this transfer unit 11, and then brought to a storehouse. This movement between the transfer unit 11 and the storehouse can be achieved with a conveyor, or even with autonomous trolleys. The location of the product stack 10 in the storehouse is recorded in a central controller. Preferably, the position of each separate tray 3 of a product stack 10 in the storehouse is tracked and identified, for example with a central controller. The product stack 10 will later be extracted again upon request, when the products 1 it comprises are required.

In an execution downstream to a treatment line, the process works as a palletization process. If executed upstream to a product 1 treatment line, this transfer unit 11 and corresponding process work as a depalletisation process, providing products 1 to a treatment line. The cycle is the following:

a product stack 10 is taken out from a storehouse, upon request. The storehouse comprises product stacks 10 with products 1 of different nature. Advantageously, each tray 3 is specifically identified and located in the storehouse. The entire product stack 10 having the required product 1 type is extracted from the warehouse or storehouse. It is then brought in the receiving zone 5 of the transfer unit 5;

If applicable, a step is performed during which the vertical straps fixing the trays 3 together are cut and removed;

The first actuator 12 then grasps the uppermost loaded tray 3 of the product stack 10 and lifts it to reach the height of the collection surface 2. This transferred tray 3 is the collection tray 4;

The products 1 in the collection tray 4 are then swept on the collection surface 2. Of course a door of the collection tray 4 is opened beforehand to let the product 1 move;

Once the collection tray 4 is empty, it is brought to an empty tray stack 6, in an empty tray zone 7.

In the palletization mode, in order to reduce the cycle time, opening the collection tray 4 can be achieved before the tray 3 arrives in front of the collection surface 2. For example, a third actuator 14 may be provided, which then works for bringing an side opened collection tray 4 from the empty tray stack 6 to an intermediary zone 8. This first movement can be achieved while the first actuator 12 is still operating the collection tray 4 of the preceding cycle. The first actuator 12 then grasps the open collection tray 4 in the intermediary zone 8, and brings it near the collection surface 2 for product 1 transfer.

The transfer unit 11 can have an upper deck, at the level of which is the collection surface 2. The intermediary zone 8 is preferably located under said upper deck, so that the distance between the intermediary zone 8 and the collection surface 1 is less than the distance between the empty tray zone 7 and said collection surface 2. Using such an intermediary zone 8 helps in reducing the distance the first actuator 12 travels, thereby reducing the cycle time.

The third actuator 14 can also be in charge of opening the collection tray 4. In some embodiments, the tray 3 has a removable side wall, acting as a door, which is to be removed for product 1 transfer with the collection surface 2. The third actuator 14 then grasps this removable wall prior to depositing the collection tray 4 in the intermediary zone 8. The removed wall can then be brought to the second actuator 13. The second actuator 13 then pushes the batch of products 1 standing and waiting on the collection surface 2, with the help of the removed wall. At the end of the sweep movement, the side wall naturally arrives again in its closing position in the collection tray 4. This means that closing the collection tray 4 may be achieved by the second actuator 13 itself, at the end of the sweeping movement for transfer. This reduces the cycle time.

In the above described embodiments, the loaded collection tray 4 is moved and loaded on a stack of trays 3, forming a pile. In other words, the trays 3 leave the receiving zone 5 as a group: loaded trays 3 wait for a predetermined number of trays 3 to be piled on a pallet 9 in the receiving zone 5 before moving from said zone. In some other embodiments, there is no such buffering of the trays 3: the first actuator 12 delivers the loaded collection tray 4 directly on a conveying means, and this conveying means extracts one tray 3 at a time. This may lead to storing each tray 3 in a separate location in the storehouse, thereby further increasing the mixing possibilities. Roller based or belt based conveyors can be used for this continuous displacement of the trays 3.

The collection tray 4 can also be released by the first actuator 12 on autonomous vehicles. Each vehicle treats one or more tray 3 at a time.

The transfer unit 11 can be organized with an upper platform, comprising the collection surface 2 and abutting products 1 conveyors. The empty tray zone 7, in which empty trays 3 are waiting to be processed, and the receiving out 5, in which loaded trays are waiting to be delivered, are located under said platform, preferably near ground level, at least at a lower vertical level. The transfer unit 11 is therefore compact, with a limited footprint. The first actuator 12 may be based on the ground. The second actuator 13 may be based on this platform. The third actuator 14, if present, can also be based on the ground directly.

As understood from this description, this invention provides for a flexible process, able to treat any kind of products 1: only minor changes are needed for treating a new type of products 1. Also, the proposed process and associated transfer unit 11 allow for a very fast cycle time. This invention particularly fits installation in which products 1 of different types are temporarily extracted from a manufacturing line and buffered in a storehouse from which they are further extracted upon request for a later treatment, for example for mixing products 1 of different types in a common downstream process line.

The product 1 transfer process between the trays 3 and the line, either as line input or as line output, is made easy thanks to a mere sweeping movement between a collection surface 2 and a collection tray 4. The use of trays 3 in which products 1 stand allows precise identification for tracking and storing. Also, trays 3 may be moved independently, on conveyors or else, one after the other, for transporting simultaneously a batch of products 1. For example, rather than being unloaded with the above described process after extraction from the storehouse, trays 3 can be put directly by the first actuator 12 on conveyors for further displacement and processing of their products 1.

While specific embodiments of the invention have been described in detail, it will be appreciated by those skilled in the art that various modifications and alternatives to those details, in addition to those discussed above, could be developed in light of the overall teachings of the disclosure. Accordingly, the particular arrangements disclosed are meant to be illustrative only, and not limiting as to the scope of the invention which is to be given the full breadth of the claims appended in any and all equivalents thereof, including any combination of their features.

The invention claimed is:

1. Method for transferring products (1), to or from a product collection surface (2) of a product (1) processing line, on which they can accumulate, in which method products (1) are stored in trays (3), the method comprising:
   for unloading products (1):
      a loaded tray (3) transfer step, during which a collection tray (4), is separately moved between the collection surface (2) and a receiving zone (5), where conveying means for tray (3) are provided, and
      an empty tray (3) transfer step, during which the collection tray (4), empty, is transferred between the collection surface (2) and the top of an empty tray stack (6) in an empty tray zone (7);
   for loading products (1):
      the empty tray (3) transfer step comprises:
         a first step of bringing the empty collection tray (4) from the empty tray stack (6) to an intermediary zone (8), and
         a second step of bringing the collection tray (4) from said intermediary zone (8) to the collection surface (2)
   the method further comprising
   a product transfer step, during which products (1) are transferred between the collection surface (2) and the collection tray (4) as a single batch of products (1), in one step, from the back with a single planar sweeping movement, while the collection tray (4) is held flush with the collection surface (2) by an actuator (12) holding the loaded tray (3) in front of the collection surface (2), and moves the tray (3) fully loaded, before or after holding the tray (3), and unloaded, after or before holding the tray (3), the first actuator (12) being in charge of maintaining one single collection tray (4) at a time in front of the collection surface (2), as well as of moving the tray (3) to or from the receiving zone (5), and to or from the empty tray zone (7).

2. Method according to claim 1, further comprising a step of opening the collection tray (4).

3. Method according to claim 2, further comprising a step of closing the collection tray (3), after the collection tray (4) has received products (1) from the collection surface (2) in front of which the collection tray (3) temporarily stays.

4. Method according to claim 3, wherein closing the collection tray (3) is the final phase of the product (1) sweeping transfer from the collection surface (2) to the collection tray (3).

5. Method according to claim 2, wherein the empty tray (3) opening step is performed before depositing it in the intermediary zone (8).

6. Method according to claim 2, wherein trays (3) are stacked on a pallet (9) as a product stack (10) in the receiving zone (5) prior to moving them from said zone, the method further comprising at least one strapping step.

7. Method according to claim 1, wherein trays (3) are stacked on a pallet (9) as a product stack (10) in the receiving zone (5) prior to moving them from said zone, the method further comprising at least one strapping step.

8. Method according to claim 1, further comprising a product stack transfer step, during which the at least one tray (3) stacked on a pallet in the receiving zone (5) is transferred between said receiving zone (5) and a storehouse able to store such trays (3) stacked on a pallet.

9. Method according to claim 1, further comprising a step of opening the collection tray (4).

10. Transfer unit (11) for transferring products (1) either to or from a collection surface (2) of a processing line, on which the products (1) can accumulate, said unit (11) comprising a receiving zone (5) for receiving trays (3), where a tray (3) conveying means is provided, further comprising:
   a first actuator (12) for transferring a collection tray (4) between the receiving zone (5) and in front of the collection surface (2), holding the loaded tray (3) in front of the collection surface (2), and moves the tray (3) fully loaded, before or after holding the tray (3), and unloaded, after or before holding the tray (3), the first actuator (12) being in charge of maintaining one single collection tray (4) at a time in front of the collection surface (2), as well as of moving the tray (3) to or from the receiving zone (5), and to or from the empty tray zone (7), and
   a second actuator (13) for transferring products (1) as a single batch of products (1), in one step, from the back with a single sweep movement between the collection surface (2) and the collection tray (4) while facing said collection surface (2).

11. Transfer unit (11) according to claim 10, wherein the second actuator (13) works as a pusher moved along a linear sweeping direction.

12. Transfer unit (11) according to claim 10, further comprising an empty tray zone (7), where an empty tray (3) can be taken from the top of an empty tray stack (6) located therein and brought in front of the collection surface (2) for being loaded with products (1), the first actuator (12) contributing to transferring the empty tray (3) between the empty tray zone (7) and the collection surface (2).

13. Transfer unit (11) according to claim 12, wherein the collection surface (2) is at an upper deck, above the empty tray zone (7).

14. Transfer unit (11) according to claim 10, further comprising an intermediary zone (8), as well as a third actuator (14), for transferring the empty tray (3) between the empty tray zone (7) and the intermediary zone (8), the first actuator (12) transferring the empty tray (3) between the intermediary zone (8) and the collection surface (2).

* * * * *